(12) United States Patent
Götz et al.

(10) Patent No.: US 8,100,790 B2
(45) Date of Patent: Jan. 24, 2012

(54) CONICAL DISK PAIR FOR A BELT-DRIVEN CONICAL-PULLEY TRANSMISSION

(75) Inventors: Andreas Götz, Rastatt (DE); Eugen Kremer, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 444 days.

(21) Appl. No.: 12/082,688

(22) Filed: Apr. 11, 2008

(65) Prior Publication Data
US 2010/0234152 A1 Sep. 16, 2010

Related U.S. Application Data

(60) Provisional application No. 60/923,156, filed on Apr. 12, 2007.

(51) Int. Cl.
*F16H 59/00* (2006.01)
*F16H 9/12* (2006.01)

(52) U.S. Cl. .................................................. 474/28
(58) Field of Classification Search .............. 474/8, 17, 474/18, 19, 28, 43, 51, 103; 477/45, 49
See application file for complete search history.

(56) References Cited

U.S. PATENT DOCUMENTS

| 6,926,632 B2 * | 8/2005 | Brown ........................... 474/35 |
| 2007/0155550 A1 | 7/2007 | Faust ............................... 474/8 |

* cited by examiner

*Primary Examiner* — William E Dondero
(74) *Attorney, Agent, or Firm* — Alfred J. Mangels

(57) ABSTRACT

A sensing device integrated into a conical disk pair includes a sensing piston that is axially movable relative to the input shaft over a radially stepped guide surface that is formed on a shaft on which the sensing device is carried, and a corresponding opposing stepped surface formed on the sensing piston. The steps define a damping chamber between the guide surface and the opposing surface, whose volume changes when the sensing piston moves axially relative to the shaft.

4 Claims, 3 Drawing Sheets

CONICAL DISK PAIR FOR A BELT-DRIVEN CONICAL-PULLEY TRANSMISSION

BACKGROUND OF THE INVENTION

1. Field of the Invention

The present invention relates to a conical disk pair for a belt-driven conical-pulley transmission.

2. Description of the Related Art

Belt-driven conical-pulley transmissions, also known as CVT transmissions, such as are employed in motor vehicles, for example, include two pairs of conical disks that are encircled by an endless torque-transmitting means, for example a plate link chain. By changing the spacing between the conical disks of each conical disk pair in opposite directions, the transmission ratio of the transmission can be varied continuously. Advantageously, a conical disk pair, preferably the one on the power input side, includes an integrated torque sensor with which the torque delivered by a drive engine is detected, and an axially-directed pressure between the conical disks of the corresponding disk pair is changed in accordance with the torque.

Such an inherently known conical disk pair will be described below on the basis of FIGS. 1 and 2, which each show a longitudinal section through a conical disk pair, but with the sensing piston located in different positions.

As shown in FIG. 1, a pair of conical disks of a belt-driven conical-pulley transmission includes an input shaft 10 that is made in one piece with an axially fixed disk 12. Situated on shaft 10, axially movable but connected to the shaft 10 in a rotationally fixed connection, is an axially movable disk 14. An endless torque transmitting means (not shown) circulates between the conical surfaces of disks 12 and 14 on the input side of the transmission and the conical surfaces of another pair of conical disks (not shown) that are on the output side of the transmission.

On the back side of movable disk 14 in its radially outer area, a cylindrical ring 16 having two radially spaced walls is rigidly attached, within which a piston 18 operates, so that on the right side of piston 18, as viewed in FIG. 1, a first pressure chamber 20 is formed. Chamber 20 is subjected to hydraulic pressure through radial bores 22 bored in axially movable disk 14, an annular chamber 24 between axially movable disk 14 and shaft 10, a radial bore 26, and an axial bore 28 bored in shaft 3, which hydraulic pressure is changeable to adjust the transmission ratio.

Piston 18, which is of annular form, is rigidly connected to a support ring 30 that is cup-shaped, and which is rigidly connected to shaft 10. On the inner side of support ring 30 is an annular component 34 having a shaped surface 32, and which is rigidly connected to the shaft 10.

Also situated within the support ring 30 is an axially movable, annular sensing piston 36 that includes a seal that acts against the circumferential outer surface of shaft 10, and a seal that acts against an inner circumferential surface of annular component 34. Sensing piston 36 is designed with a projection directed toward axially movable disk 14, on the back face of which shaped surfaces 38 are formed that constitute opposed surfaces to the shaped surface 32. Situated between shaped surfaces 32 and 38 are rolling elements, in the illustrated example balls 40.

Between sensing piston 36 and axially movable disk 14 a second pressure chamber 42 is formed that can be subjected to hydraulic pressure through a supply line 44 in shaft 10, the hydraulic fluid being removable through a drain line 46 that is also formed in shaft 10.

The effective cross-sectional area of the inflow opening 48 that leads into the second pressure chamber 42 is determined by the axial position of axially movable disk 14. The open area of the outflow opening 50 leading out of the second pressure chamber 42 is determined by the position of sensing piston 36. Sensing piston 36 includes axial arms 52 that extend through apertures in the support ring 30. Axial arms 52 are preferably spaced at equal intervals in the circumferential direction. The radially outer surfaces of the axial arms 52 are provided with axially and radially outwardly extending teeth that mesh with inner teeth of an input wheel 54, which is supported and is substantially axially immovable on an external shell 56 of a bearing which is designated in its entirety as 58.

The construction and the function of the conical disk pair described so far are known and will therefore be explained only briefly.

When there is a torque from the rotationally driven input wheel 54 acting on axial arms 52 of sensing piston 36, that torque is transmitted via the shaped surfaces 38, the balls 40, and the shaped surfaces 32 to the support ring wall 30, and thereby to the shaft 10. The shaped surfaces 32, 38 are designed so that as the torque increases sensing piston 36 moves to the right as viewed in FIG. 1, so that the outflow opening 50, which is not completely covered by the sensing piston in the basic or starting position of the conical disk pair as shown in FIG. 1, is increasingly closed. FIG. 2 shows the arrangement of FIG. 1 with very high torque, at which the sensing piston 36 is shifted as far as possible to the right and completely covers the outflow opening 50. As the effective size of the outflow 50 becomes smaller, the pressure in second pressure chamber 42 increases, so that a pressure that is a function of the input torque acts against axially movable disk 14.

Advantageously, to support the free ends of the arms 52, a support ring 60 is provided that is in contact with the radially inner sides of the end areas of the arms 52 and urges them outward, so that the radially-outwardly-extending teeth of the arms are forced into secure meshing engagement with the inner teeth of the input wheel 54.

The arms 52 are advantageously formed on an annular element that is welded to the sensing piston 36, as shown, and from which they project axially. In that way the welding of the arms relative to the annular element relieves them of bending forces that act directly on the arms in a circumferential direction.

A peculiarity of conical disk pairs having an integrated torque sensor, as described above, consists in the fact that torque oscillations can occur through the entire system, depending upon mass inertias and rigidities in the power train of a vehicle, the damping of the overall system, and of support gradients over the transmission ratio. Such torque oscillations cause comfort problems, or possibly even an overloading of the transmission. The problems become more severe as the maximum permissible torque of a drive engine increases.

An object of the present invention is to provide a remedy for the above-identified problem.

SUMMARY OF THE INVENTION

The object is achieved by a conical disk pair for a belt-driven conical-pulley transmission, which conical disk pair includes a shaft that is rigidly connected to an axially fixed disk, an axially movable disk that is situated on the shaft so that it is axially movable and rotationally fixed. The disk pair includes a torque sensing device having a first shaped surface that is rigidly connected to the shaft, and a second shaped surface that is rigidly connected to a sensing piston that surrounds the shaft and is rotatable and axially movable relative to the shaft. The sensing piston is engaged with a rotationally-driven input wheel in rotationally fixed and axially movable engagement. Rolling elements are situated between the first and second shaped surfaces, the shaped surfaces being designed in such a way that when there is a change in the torque acting between the sensing piston and the axially movable disk, the axial position of the sensing piston changes due to shifting along the shaped surfaces of the rolling elements that are situated between the shaped surfaces. The sensing piston increasingly closes an outflow opening formed in the shaft for fluid to flow from a pressure chamber bounding the sensing piston. Additionally, a sensing piston guide surface formed on the shaft and a corresponding opposed surface formed on the sensing piston each include a radial step, so that a damping chamber that contains fluid during operation is formed between the sensing piston guide surface on the shaft and the opposed surface on the sensing piston, whose volume changes when the sensing piston is moved axially relative to the shaft.

In accordance with the present invention, the axial movability of the sensing piston relative to the input shaft is damped by the fact that hydraulic fluid must flow into or out of the damping chamber. The flow capacity that is required, which affects the degree of damping that is achieved, can be set appropriately by matching the change in volume of the damping chamber that accompanies a predetermined relative movement of the sensing piston, and the areas of passageways that connect the damping chamber with the surroundings, for example a centering gap of the guide of the sensing piston on the input shaft.

Advantageously, a fluid connection exists between the damping chamber and the surroundings, exclusively between the sensing piston guide surface and the opposed surface on the sensing piston.

In a preferred embodiment of the conical disk pair in accordance with the present invention, a sealing ring is situated between the sensing piston and the shaft on the side of the damping chamber that faces away from the outflow opening.

It can be advantageous if the sensing piston is engaged with the input wheel on its side that faces away from the axially movable disk.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
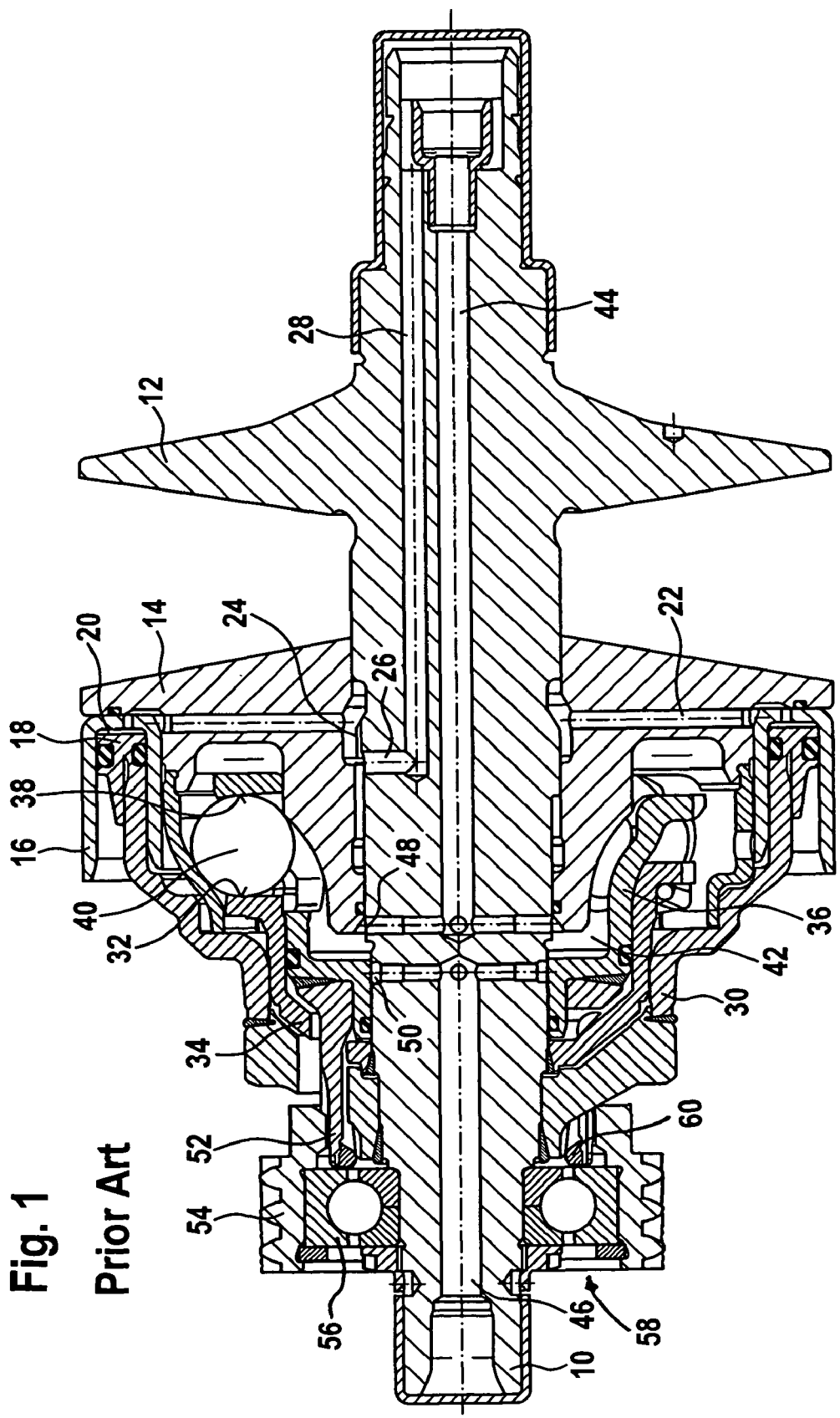
FIG. 1 is a longitudinal cross-sectional view of a known conical disk pair.
Figure 2:
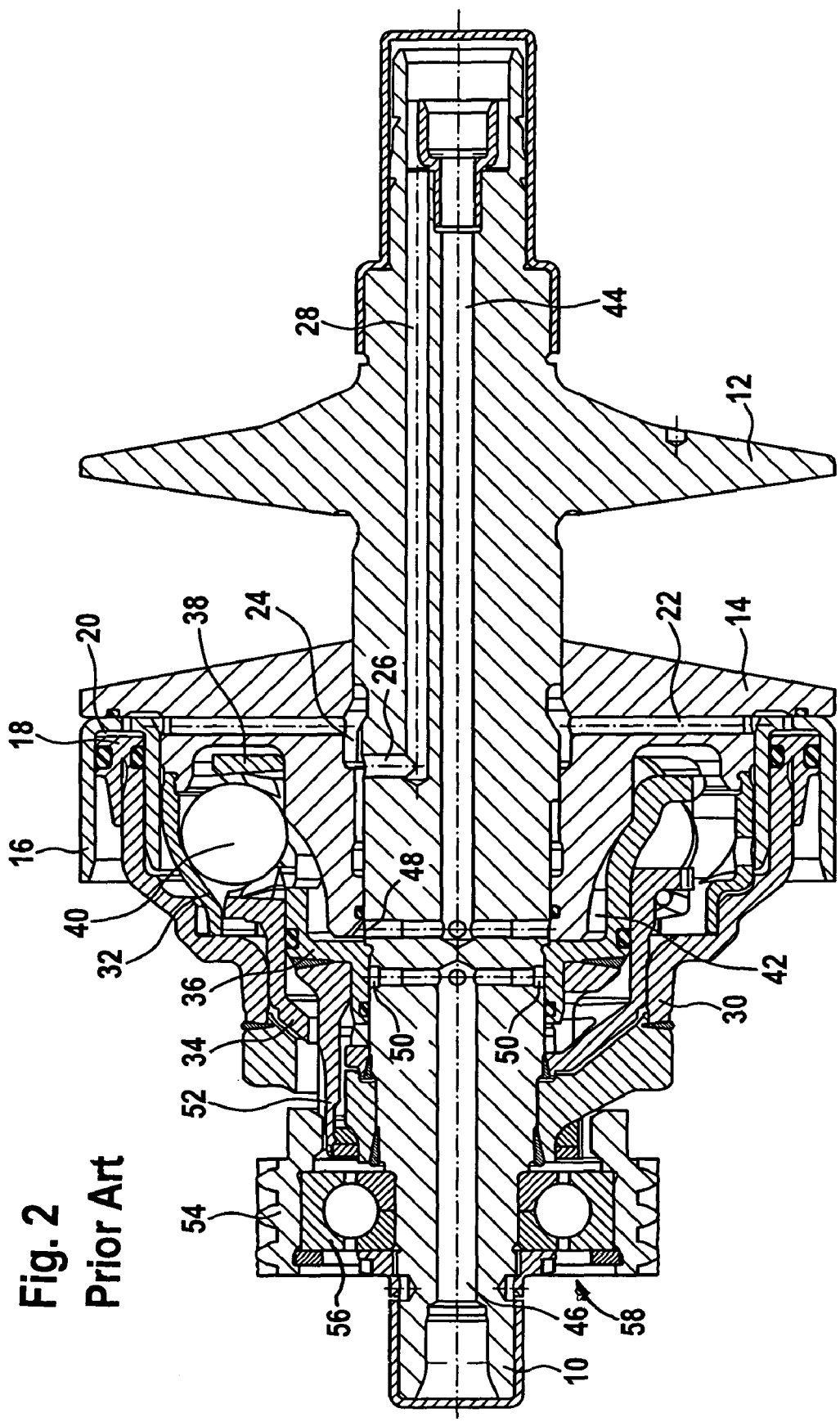
FIG. 2 is a longitudinal cross-sectional view similar to that of FIG. 1, but with the sensing piston in a different position.
Figure 3:
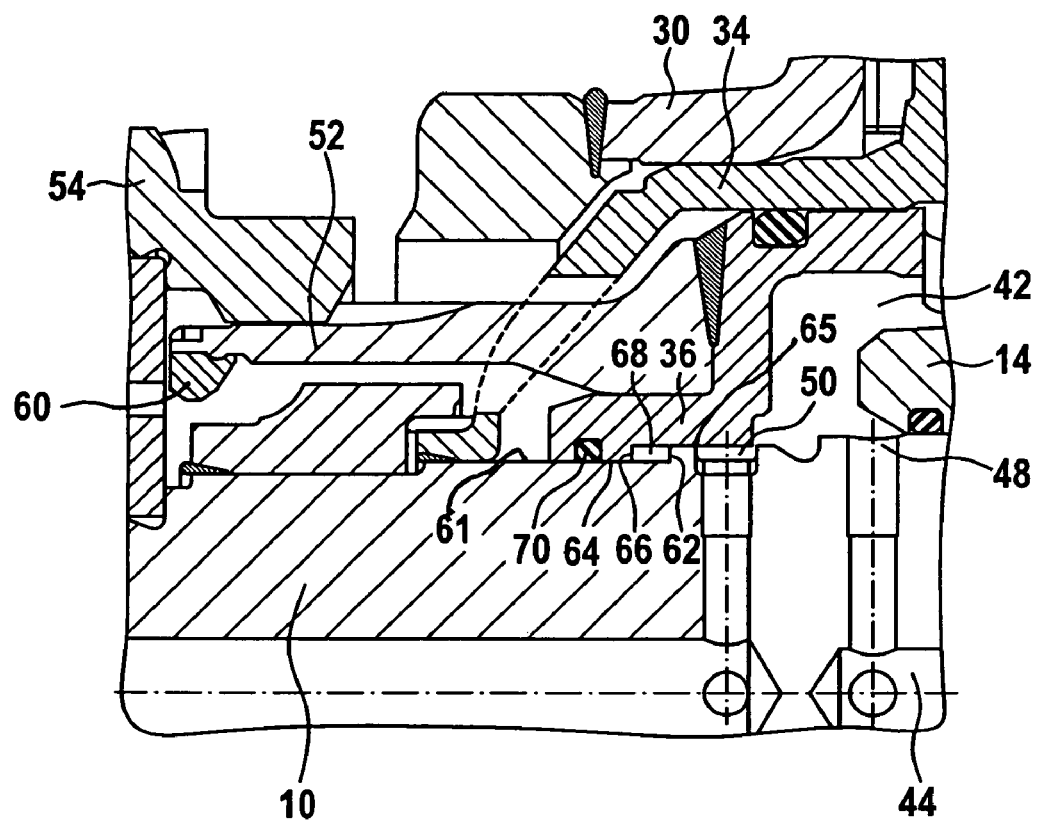
FIG. 3 is an enlarged, fragmentary, cross-sectional view in accordance with an embodiment of the present invention of the region of the axially movable conical disk where the sensing piston is axially guided on the input shaft.

FIG. 3 shows an enlarged detail of a portion of the structure shown in FIG. 1 that has been modified according in accordance with the present invention. Input shaft 10 includes a guide surface 61 that has a radially-outwardly-extending step 62 that is axially spaced from outflow opening 50. An opposed surface 64 of sensing piston 36 that is axially guided on the guide surface 61 includes a radially-inwardly-extending step 66, and an adjacent recess that defines a damping chamber 68 between the radially-extending steps 62 and 66. The volume of damping chamber 68 changes when sensing piston 36 moves axially relative to input shaft 10.

On the left side of step 66 as viewed in FIG. 3, a sealing ring 70 is situated between sensing piston 36 and input shaft 10, so that damping chamber 68 communicates with the outflow opening 50, or with the second pressure chamber 42, only through a passageway that is on the right side of step 66 and extends between recessed surface 65 of sensing piston 36 and guide surface 61 of input shaft 10, and between recessed surface 65 and the radially outer surface of step 62. That passageway can be provided by an annular gap between recessed surface 65 of sensing piston 36 and the radially outer surface of step 62, which is the result of their respective radial dimensions, to form a guidance gap, or it can be formed precisely by one or more small, axially-extending channels that interconnect damping chamber 68 and outflow opening 50.

As it undergoes enlargement, the damping chamber 68 draws in hydraulic fluid from the outflow opening 50, or from the second pressure chamber 42, which fluid flows out of damping chamber 68 when it becomes smaller. The energy converted in the process as a consequence of the flow resistance, which has the effect of damping the axial motion of the sensing piston 36, can be appropriately adjusted by suitably dimensioning the surfaces that define the volume of damping chamber 68, which volume is related to the movement of sensing piston 36, as well as by suitably dimensioning the flow area between damping chamber 68 and outflow opening 50 or second pressure chamber 42. With increasing radial step height and decreasing cross section of the center gap between the sensing piston and the guide surface, for example, the damping effect increases.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A conical disk pair for a belt-driven conical-pulley transmission, said conical disk pair comprising:
   a shaft that is rigidly connected to an axially fixed disk,
   an axially movable disk that is carried on the shaft so that it is axially movable along the shaft and is rotationally fixed thereto,
   a torque sensing device having a first shaped surface that is rigidly connected to the shaft, and having a second shaped surface that is rigidly connected to an annular sensing piston that surrounds the shaft and is axially movable along and rotatable relative to the shaft, which sensing piston is non-rotatably connected with and is axially movable relative to an input wheel,
   rolling elements positioned between the first and second shaped surfaces,
   the first and second shaped surfaces formed so that when an operative torque between the sensing piston and the movable disk changes, the axial position of the sensing piston along the shaft changes due to the rolling elements situated between the first and second shaped surfaces rolling along the first and second shaped surfaces, and so that the sensing piston increasingly closes an outflow opening formed in the shaft for fluid to flow out of a pressure chamber that bounds the sensing piston, and a recessed cylindrical guide surface formed on the shaft for axially guiding the sensing piston along the shaft and positioned radially opposite to and radially spaced from a corresponding opposed cylindrical surface formed on an inner surface of the sensing piston, wherein the cylindrical guide surface of the shaft includes a first, radially-outwardly-extending step and the opposed inner cylindrical surface of the sensing piston includes a second, radially-inwardly-extending step that axially faces and is axially opposed to and spaced from the first radially-extending step to define therebetween an annular damping chamber that contains fluid during operation of the transmission, wherein the annular damping chamber is bounded between the cylindrical guide surface of the shaft, the opposed cylindrical inner surface of the sensing piston, and the first and second axially-spaced and axially-opposed radial steps, and wherein the damping chamber has a volume that changes when the sensing piston is moved axially relative to the shaft for damping axial motion of the sensing piston relative to the shaft.

2. A conical disk pair in accordance with claim 1, including a passageway defining a fluid connection between the damping chamber and a pressure chamber defined between the axially movable disk and the sensing piston.

3. A conical disk pair in accordance with claim 2, including a sealing ring positioned between the sensing piston and the shaft adjacent to an axial end of the damping chamber that is axially spaced from the outflow opening.

4. A conical disk pair in accordance with claim 1, wherein the sensing piston is operatively engaged for rotational movement with the input wheel on a side of the sensing piston that faces away from the axially movable disk.

* * * * *